United States Patent
Lee et al.

(10) Patent No.: US 8,358,676 B2
(45) Date of Patent: Jan. 22, 2013

(54) DATA TRANSMITTING/RECEIVING METHOD AND APPARATUS IN UWB COMMUNICATION SYSTEM

(75) Inventors: Young-woo Lee, Suwon-si (KR); Dong-ho Rhee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1026 days.

(21) Appl. No.: 12/243,220

(22) Filed: Oct. 1, 2008

(65) Prior Publication Data

US 2009/0180517 A1 Jul. 16, 2009

(30) Foreign Application Priority Data

Jan. 15, 2008 (KR) .................. 10-2008-0004588

(51) Int. Cl.
*H04B 1/00* (2006.01)
(52) U.S. Cl. ...................... 375/130; 375/131
(58) Field of Classification Search ............ 375/130
See application file for complete search history.

(56) References Cited

U.S. PATENT DOCUMENTS

| | | | | |
|---|---|---|---|---|
| 6,865,232 B1* | 3/2005 | Isaksson et al. | ............ | 375/260 |
| 7,082,108 B2* | 7/2006 | Hwang et al. | ............ | 370/311 |
| 7,283,816 B2* | 10/2007 | Fok et al. | ............ | 455/423 |
| 7,346,124 B2* | 3/2008 | Abdellaoui et al. | ............ | 375/300 |
| 7,450,548 B2* | 11/2008 | Haustein et al. | ............ | 370/334 |
| 7,653,122 B2* | 1/2010 | Siriwongpairat et al. | .... | 375/146 |
| 7,656,929 B2* | 2/2010 | Paquelet | ............ | 375/130 |
| 7,738,420 B2* | 6/2010 | Kim et al. | ............ | 370/329 |
| 7,843,802 B2* | 11/2010 | Yue et al. | ............ | 370/206 |
| 8,064,944 B2* | 11/2011 | Yun | ............ | 455/522 |
| 2006/0056504 A1* | 3/2006 | Aubert et al. | ............ | 375/240 |
| 2006/0193294 A1* | 8/2006 | Jorswieck et al. | ............ | 370/334 |
| 2006/0234698 A1* | 10/2006 | Fok et al. | ............ | 455/425 |
| 2007/0091983 A1* | 4/2007 | Siriwongpairat et al. | .... | 375/130 |
| 2007/0121666 A1* | 5/2007 | Kim et al. | ............ | 370/461 |
| 2008/0044005 A1* | 2/2008 | Johnston | ............ | 379/433.01 |
| 2008/0062919 A1* | 3/2008 | Chen et al. | ............ | 370/329 |
| 2009/0147872 A1* | 6/2009 | Chong et al. | ............ | 375/260 |
| 2009/0154588 A1* | 6/2009 | Chen et al. | ............ | 375/267 |
| 2009/0180517 A1* | 7/2009 | Lee et al. | ............ | 375/130 |
| 2010/0002598 A1* | 1/2010 | Pan et al. | ............ | 370/252 |
| 2011/0173485 A1* | 7/2011 | Hassan et al. | ............ | 714/2 |

* cited by examiner

*Primary Examiner* — David Ometz
*Assistant Examiner* — Santiago Garcia
(74) *Attorney, Agent, or Firm* — Staas & Halsey LLP

(57) ABSTRACT

A data transmitting/receiving method and apparatus for allocating optimal sub-bands and transmission power levels and transmitting data in a ultra wide band (UWB) communication system. The method includes receiving data through sub-bands of each band group; determining performance ranks of the sub-bands based on error rates and differences of transmitting and receiving power levels of the received data; selecting a predetermined number of sub-bands according to the performance ranks of the sub-bands; generating power level adjustment information based on measured power levels of data of the selected sub-bands; and receiving data according to the selected sub-bands and the power levels.

15 Claims, 4 Drawing Sheets

FIG. 2

| RFC NUMBER | BASE SEQUENCE/PREAMBLE | BAND_ID($n_b$) FOR TFC | | | | | |
|---|---|---|---|---|---|---|---|
| 1 | 1 | 1 | 2 | 3 | 1 | 2 | 3 |
| 2 | 2 | 1 | 3 | 2 | 1 | 3 | 2 |
| 3 | 3 | 1 | 1 | 2 | 2 | 3 | 3 |
| 4 | 4 | 1 | 1 | 3 | 3 | 2 | 2 |
| 5 | 5 | 1 | 1 | 1 | 1 | 1 | 1 |
| 6 | 6 | 2 | 2 | 2 | 2 | 2 | 2 |
| 7 | 7 | 3 | 3 | 3 | 3 | 3 | 3 |

DATA TRANSMITTING/RECEIVING METHOD AND APPARATUS IN UWB COMMUNICATION SYSTEM

CROSS-REFERENCE TO RELATED APPLICATION

This application claims the benefit of Korean Patent Application No. 2008-4588, filed in the Korean Intellectual Property Office on Jan. 15, 2008, the disclosure of which is incorporated herein by reference.

BACKGROUND OF THE INVENTION

1. Field of the Invention

Aspects of the present invention relate to an ultra wide band (UWB) communication system, and more particularly, to a data transmitting/receiving method and apparatus for allocating optimal sub-bands and transmission power levels to apparatuses in the UWB communication system and transmitting and receiving data.

2. Description of the Related Art

Recently, the development of wireless communication technologies and the widespread use of wireless apparatuses have completely changed the way people are living. Particularly, an ultra wide band (UWB) communication technology capable of implementing high-speed wide band wireless communication together with existing wireless communication service without addition frequency resources has been researched and developed.

The UWB communication standard is a wireless communication standard that can be used for all types of applications in a wireless personal area network (WPAN). According to the UWB communication standard, data communication can be performed in indoor, outdoor, and other various situations and locations. In the UWB communication technology, some carrier waves are not used for data communication, but data 0 and 1 are repeatedly represented with electrical signal pulses having a predetermined period and waveform by a very short time interval of 1 nanosecond or less.

A UWB system is generally configured in a multi-band orthogonal frequency division multiplexing (MB OFDM) scheme, in which the data transmission is performed in a transmission mode using time frequency codes (TFCs) among a total of 30 transmission modes. In addition, in the wireless personal area network (WPAN), since the UWB system is used together with wireless communication for indoor, outdoor, and other various situations, loss characteristics of corresponding bands vary according to the situation and location of the data transmission.

The UWB system performs the data transmission using sub-bands of which orders are defined according to the TFCs. In addition, the same transmitting power levels are allocated to the sub-bands. However, the UWB system has a tendency to have different fading characteristics and different propagation loss characteristics according to the sub-bands. In addition, the UWB system may also have different loss characteristics according to the sub-bands in different transmission situations and locations. In this case, if the transmission environment is deteriorated, the data transmission scheme used for the UWB system has a problem in that communication efficiency is lowered.

SUMMARY OF THE INVENTION

Aspects of the present invention provide a data transmitting/receiving method and apparatus used in a UWB system, capable of transmitting data in a sub-band having optimal transmission characteristics with a low power level in which an error rate of data is not larger than a transmission error allowable threshold value.

According to an aspect of the present invention, a data transmitting method in a UWB (ultra wide band) communication system is provided. The data transmitting method includes transmitting sample data to sub-bands of each of a plurality of band groups; allocating transmission sub-bands according to performance rank information of the sub-bands, the performance rank information determined based on loss of transmission power levels and error rates of the transmission data; adjusting the transmission power levels of the allocated sub-bands within an allowable threshold value; and communicating according to the allocated sub-bands and the adjusted transmission power levels of the sub-bands.

According to another aspect of the present invention, a data receiving method in an ultra wide band (UWB) communication system is provided. The data receiving method includes receiving sample data through sub-bands of each of a plurality of band groups; determining performance ranks of the sub-bands based on error rates and differences of transmitting and receiving power levels of the sample data; selecting a predetermined number of sub-bands according to the performance ranks of the sub-bands; generating power level adjustment information based on measured power levels of the sample data of the selected sub-bands; and communicating according to the selected sub-bands and the power levels.

According to another aspect of the present invention, there is provided a data transmitting apparatus in an ultra wide band (UWB) communication system is provided. The apparatus includes a transmission data processor to allocate transmission sub-bands according to performance rank information of sub-bands received from apparatuses connected to a network and to adjust transmission power levels of the allocated sub-bands within a threshold value; a transmitting module to transmit a UWB data processed by the transmission data process to the connected apparatuses; and a receiving module to receive the performance ranks and data power level information of the sub-bands from the connected apparatuses and to apply the performance ranks and the data power level information to the transmission data processor.

According to another aspect of the present invention, a data receiving apparatus in an ultra wide band (UWB) communication system, including a reception data processor to select a predetermined number of sub-bands according to performance ranks of the sub-bands based on error rates and a difference between transmitting and receiving power levels of sample data received from apparatuses connected to a network and to generate power level adjustment information based on measured power levels of data of the selected sub-bands; a receiving module to receive an UWB data from the apparatuses and to apply the UWB data to the reception data processor; and a transmitting module to transmit to the connected apparatuses the performance rank information and the data power level information of the sub-bands processed by the reception data processor.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 2 illustrates patterns of preambles and TFCs of a first band group of FIG. 1;

DETAILED DESCRIPTION OF THE EMBODIMENTS

Figure 1:
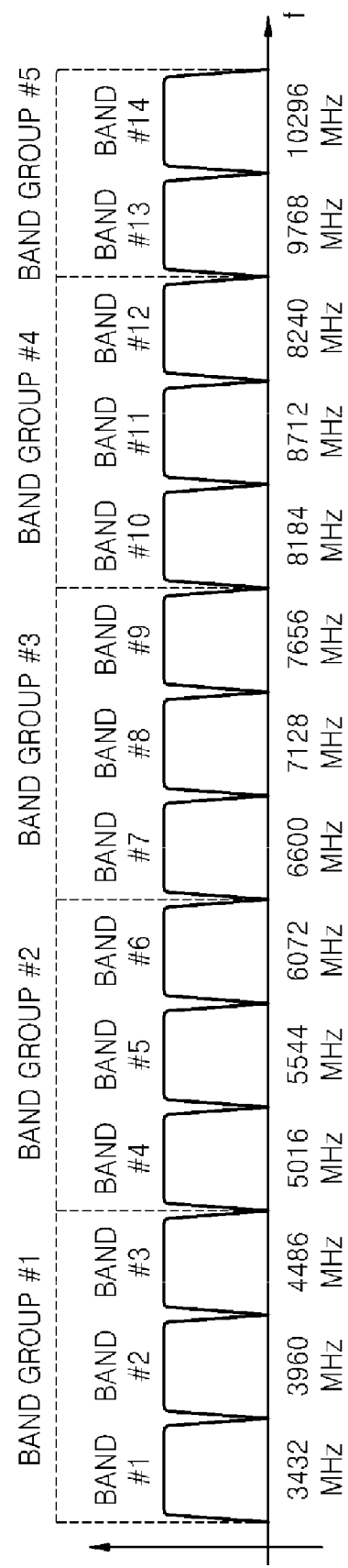
FIG. 1 illustrates concepts of sub-bands for a general MB-OFDM UWB system.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 shows concepts of sub-bands for a general multi-band orthogonal frequency division multiplexing (MB-OFDM) ultra wide band (UWB) system. A UWB system is generally configured in an MB-OFDM scheme, and aspects of the present invention described below employ the MB-OFDM scheme; however, other techniques may also be employed. In MB-OFDM, a frequency band is divided into multiple bands of 528 MHz, and a frequency hopping operation is performed. As shown in FIG. 1, a frequency band of 3.1 GHz to 10.6 GHz is divided into five band groups. The first to fourth band groups have three sub-bands, and the fifth band group has two sub-bands. One sub-band has a bandwidth of 528 MHz. The UWB system uses the sub-bands to transmit data. More specifically, the UWB system transmits data using a time frequency interleaving (TFI) mode in which each band group spreads into sub-bands and a fixed frequency interleaving (FFI) mode in which data is transmitted through one sub-band. The TFI mode includes four data transmission modes, and the FFI mode includes three data transmission modes. Five band groups are used in only the two data transmission modes of the FFI mode. Therefore, a total of 30 data transmission modes of the UWB system can be used in a total frequency.

FIG. 2 shows patterns of preambles and TFCs of a first band group of FIG. 1. FIG. 2 shows an allocation order for 1, 2, and 3 sub-bands in the first band group according to the TFC. The UWB system transmits data using the sub-bands of which order is defined according to TFC numbers. The second to fifth band groups of FIG. 1 are defined similarly to FIG. 2. For example, if the TFC number is 2, the transmission order of sub-bands becomes 1, 3, 2, 1, 3, 2, etc.

Figure 3:
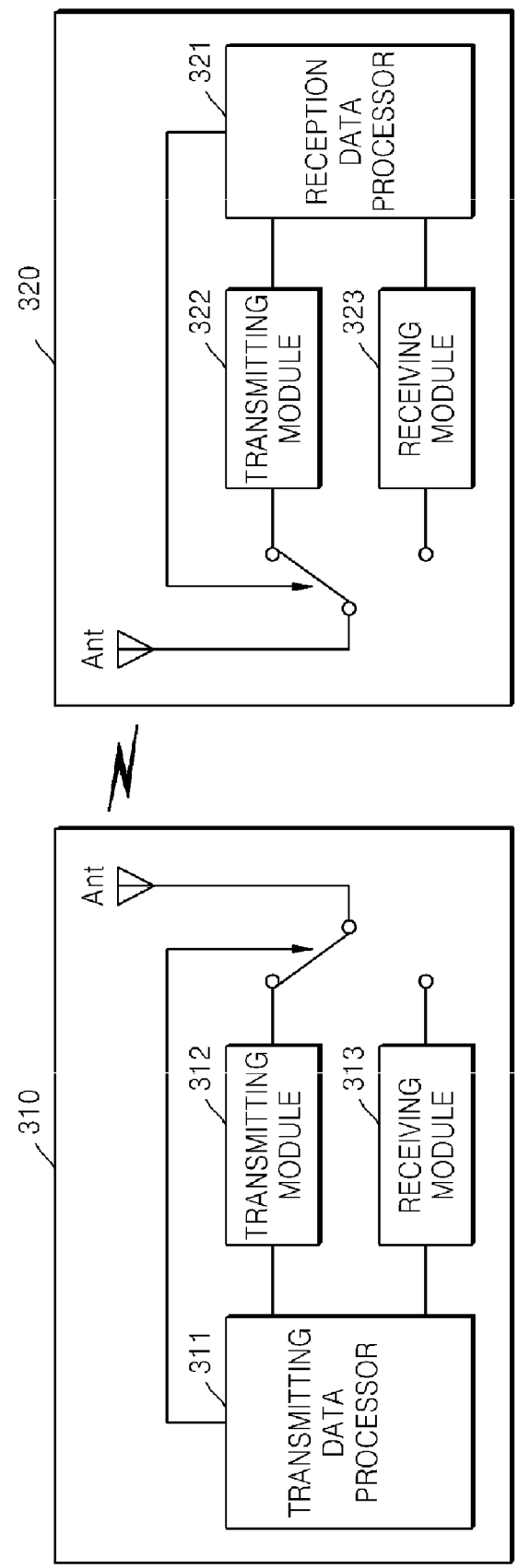
FIG. 3 illustrates a UWB communication system according to an embodiment of the present invention.

FIG. 3 shows a UWB communication system according to an embodiment of the present invention. The UWB communication system includes a data transmitting apparatus 310 and a data receiving apparatus 320. The data transmitting apparatus 310 and the data receiving apparatus 320 are connected to the UWB communication system in order to exchange data. The data transmitting apparatus 310 and the data receiving apparatus 320 exchange a predetermined sample data packet in order to find an optimal sub-band and a transmission power level.

The data transmitting apparatus 310 includes a transmitting data processor 311, a transmitting module 312, a receiving module 313, and an antenna Ant. According to other aspects of the present invention, the data transmitting apparatus may include additional and/or different units. Similarly, the functionality of two or more of the above units may be integrated into a single component. For example, the functionality of the data receiving apparatus 320 may be included in the data transmitting apparatus 310 and vice versa.

The transmission data processor 311 switches between a transmitting mode and a receiving mode. The transmission data processor 311 allocates transmission sub-bands to apparatuses according to performance ranks of the sub-bands based on loss of the transmission power levels and an error rate of transmission data. The transmission data processor 311 adjusts the transmission power levels of the sub-bands within an allowable threshold value based on data power level information of the allocated sub-bands. The transmission data processor 311 transmits data according to the transmission sub-bands and the adjusted transmission power levels.

The transmitting module 312 transmits UWB data processed by the transmission data processor 311 through the antenna Ant to the data receiving apparatus 320. The receiving module 311 receives from the data receiving apparatus 320 performance rank information and data power level information of the sub-bands through the antenna Ant.

The data receiving apparatus 320 includes a reception data processor 321, a transmitting module 322, and a receiving module 323. The reception data processor 321 switches the transmitting mode and the receiving mode. The reception data processor 321 receives sample data packets through all the sub-bands of band groups. The reception data processor 321 determines performance ranks of the sub-bands based on the error rates of the received sample data packets and differences between transmitting and receiving power levels. The reception data processor 321 selects a predetermined number of sub-bands according to the performance ranks of the sub-bands and transmits data to the transmission data processor 310. The reception data processor 321 transmits power level adjustment information based on the measured power levels of data of the sub-bands.

The transmitting module 322 transmits the performance rank information and the data power level information of the sub-bands processed by the reception data processor 321 through the antenna Ant to the data transmitting apparatus 310. The receiving module 323 receives from the data transmitting apparatus 310 data according to the selected sub-bands and the transmission power levels and transfers the data to the reception data processor 321.

Figure 4:
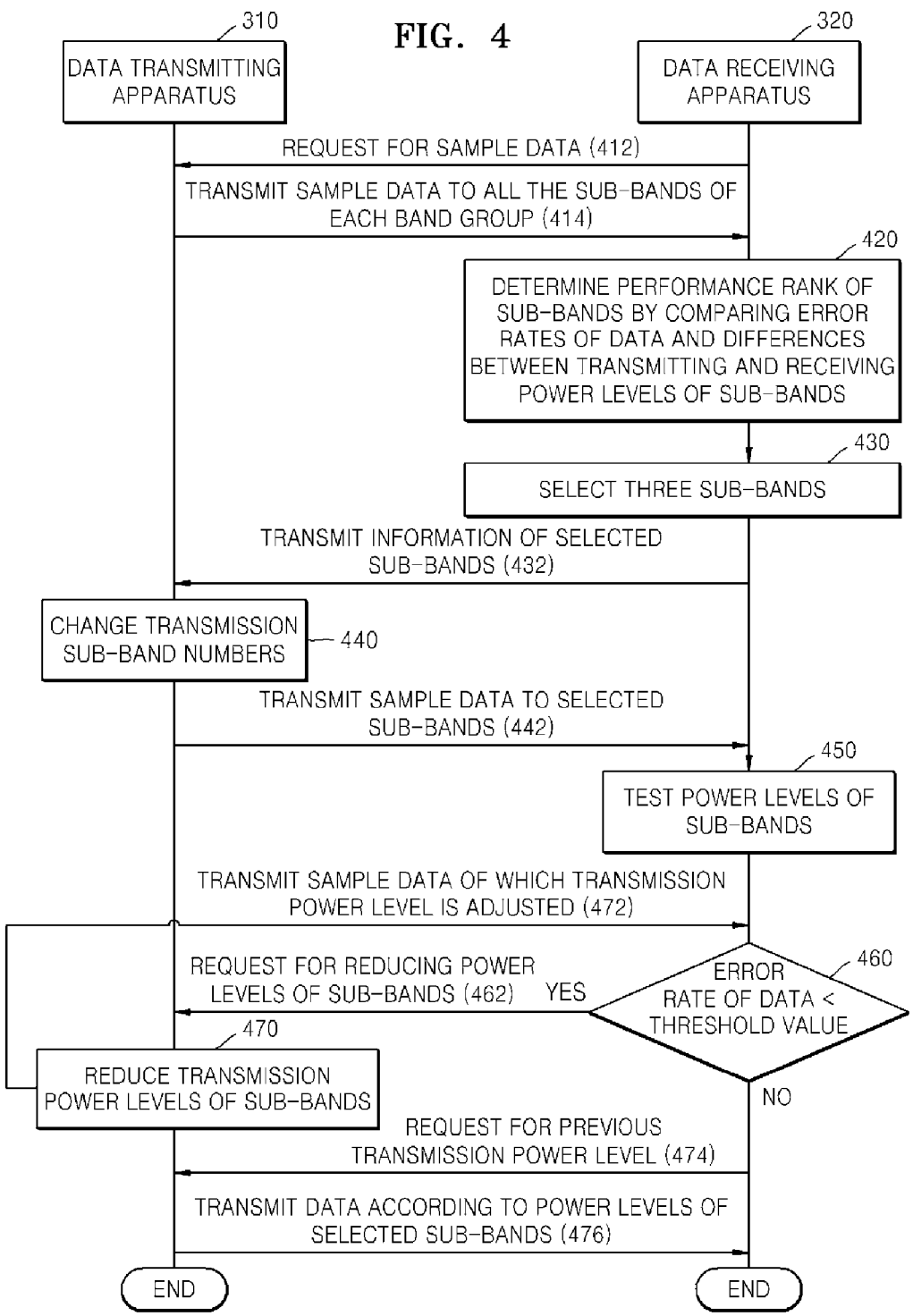
FIG. 4 is a flowchart of a data transmitting/receiving process in a UWB communication system according to an embodiment of the present invention.

FIG. 4 is a flowchart of a data transmitting/receiving method in a UWB communication system according to an embodiment of the present invention. The data receiving apparatus 320 requests a data transmitting apparatus 310 for sample data packets in order to allocate optimal sub-bands in operation 412.

The data transmitting apparatus 310 transmits the sample data packets to all the sub-bands (for example, 14 sub-bands) of available band groups (for example, 5 band groups) in operation 414. The data transmitting apparatus 310 and the data receiving apparatus 320 may be designed to know the sample data packets and the transmission power levels in advance. The transmission sub-bands are in accordance with basic settings of the data transmitting apparatus 310.

The data receiving apparatus 320 analyzes the received sample data packets to select optimal sub-bands. When selecting the optimal sub-bands, the data receiving apparatus 320 allocates weights to the data error and the difference between the transmitting and receiving power levels of each of the sub-bands (14 sub-bands) and compares the data error rates and the differences between the transmitting and receiving power levels to determine performance ranks of the sub-bands in operation 420.

For example, the performance rank of each sub-band can be expressed by Equation 1.

$$\text{Rank} = \sigma \ast PES_i + \beta \ast PLS_i \qquad \text{[Equation 1]}$$

Here, σ is a weight of a packet error rate, and β is (1−σ). PESi is a packet error rate of an i-th sub-band, and PLSi is a power level difference of the i-th sub-band.

The data receiving apparatus 320 selects three sub-bands having the highest transmission efficiency among the 14 sub-bands based on the performance ranks of the sub-bands in operation 430. The data receiving apparatus 320 transmits information of the selected three sub-bands in operation 432. The data receiving apparatus 320 may select any number of sub-bands having high efficiency, depending on the scheme employed.

The data transmitting apparatus 310 changes the transmission sub-band numbers based on the information of the three sub-bands, so that optimal transmission sub-bands can be allocated to the apparatuses in operation 440. The data transmitting apparatus 310 transmits sample data to the sub-bands corresponding to the changed sub-band number in operation 442.

The data receiving apparatus 320 tests the data power levels using the received sample data of the selected sub-bands in operation 450. The data receiving apparatus 320 requests the data transmitting apparatus 310 to reduce the transmission power level of the sub-band until the error data of data is larger than an allowable threshold value in operation 462.

For example, if the error rate of data is smaller than the allowable threshold value, the data receiving apparatus 320 requests the data transmitting apparatus 310 to adjust the transmission power level to a power level corresponding to the current power level subtracted by a reduced power level value. If the error rate of data is larger than the allowable threshold value, the data receiving apparatus 320 requests the data transmitting apparatus 310 to adjust the transmission power level to a previous power level.

Every time a command for adjusting the power level from the data receiving apparatus 320 is received, the data transmitting apparatus 310 reduces the transmission power level of each sub-band in operation 470. The data transmitting apparatus 310 transmits to the data receiving apparatus 320 the sample data of which transmission power level is adjusted in operation 472.

If the error rate of data is larger than the allowable threshold value, the receiving apparatus 320 requests the data transmitting apparatus 310 to transmit data in the previous transmission power level (operation 474). The data transmitting apparatus 310 transmits data according to the TFC using the information of the selected sub-bands and the power level information in operation 476. For example, if the selected sub-band numbers are 2, 8, and 13 and if the TFC is 2, the transmission order of the sub-bands becomes 2, 13, 8, 2, 13, 8, etc.

According to aspects of the present invention, the apparatuses exchange sample data packets to find optimal sub-bands. In another embodiment of the present invention, an agent system for periodically measuring optimal sub-bands of apparatuses at a current location and identifying optimal sub-bands of apparatuses is provided.

According to aspects of the present invention, an UWB system can be driven at a power level lower than that of an existing UWB system by reducing the power level down to an allowable threshold value of an error rate of data packet transmission. In addition, in the UWB system according to aspects of the present invention, optimal sub-bands are obtained using weights according to loss of transmission power levels and the error rate of data packets, so that the UWB system can be driven with loss lower than that of an existing UWB system.

Aspects of the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CDs, DVDs, Blu-ray discs, magnetic tapes, floppy disks, and optical data storage devices. Aspects of the present invention may also be embodied as carrier waves (such as data transmission through the Internet). The computer readable recording medium can also be distributed over network coupled computer systems so that the computer readable code is stored and executed in a distributed fashion.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A data transmitting method in a UWB (ultra wide band) communication system, the method comprising:

transmitting predetermined sample data to sub-bands of each of a plurality of band groups;

allocating transmission sub-bands according to performance rank information of the sub bands, the performance rank information determined based on applying weights to a loss of transmission power levels and error rates of the predetermined sample data for each of the sub bands;

adjusting the transmission power levels of the allocated sub-bands within an allowable threshold value; and communicating according to the allocated sub-bands and the adjusted transmission power levels of the sub-bands wherein the adjusting of the transmission power level comprises:

if the error rate of the predetermined sample data is smaller than the allowable threshold value, adjusting the current power level of the sub-band to the reduced power level; and if the error rate of the predetermined sample data is larger than the allowable threshold value, adjusting the power level of the sub-band to a previous power level.

2. The data transmitting method of claim 1, wherein the allocating of the transmission sub-bands comprises changing transmission sub-band numbers according to information of sub-bands selected based on performance ranks of the sub-bands.

3. The data transmitting method of claim 1, wherein the adjusting of the transmission power level within allowable threshold value comprises:

receiving, from a data receiving apparatus, power level adjustment information obtained by comparing the error rates of the predetermined sample data with threshold values of the sub-bands; and adjusting the transmission power levels of the sub-bands according to the power level adjustment information.

4. The data transmitting method of claim 3, wherein the adjusting of the transmission power level comprises reducing the transmission power level until the error rate of the predetermined sample data is not larger than the allowable threshold value.

5. The data transmitting method of claim 1, wherein the communicating comprises communicating based on an order of sub-bands defined according to TFC (time frequency code) and the transmission power levels determined for the sub-bands.

6. A data receiving method in an ultra-wide band (UW8) communication system, the method comprising:
receiving predetermined sample data through sub-bands of each of a plurality of band groups;
determining performance ranks of the sub-bands based on error rates and differences of transmitting and receiving power levels of the predetermined sample data, wherein the determining of the performance ranks of the sub-bands comprises determining the performance ranks of the sub-bands by applying weights to the differences between the transmitting and receiving power levels and the error rates of the predetermined sample data of each of the sub-bands; selecting a predetermined number of sub-bands according to the performance ranks of the sub-bands;
generating power level adjustment information based on measured power levels of the predetermined sample data of the selected sub-bands; and
communicating according to the selected sub-bands and the power levels . . .
wherein the generating the transmission power level comprises:
if the error rate of the predetermined sample data is smaller than an allowable threshold value, setting a power level value obtained by subtracting a reduced power level from a current power level to a power level adjustment value; and
if the error rate of the predetermined sample data is larger than the allowable threshold value, setting a previous power level value to the power level adjustment value.

7. The data receiving method of claim 6, further comprising:
transmitting the power level adjustment information to the data transmitting apparatus until an error rate of reception data of the sub-bands is not larger than an allowable threshold value.

8. A data transmitting apparatus in an ultra-wide band (UWB) communication system, the apparatus comprising:
a transmission data processor to allocate transmission sub-bands according to performance rank information of sub-bands received from apparatuses connected to a network and to adjust transmission power levels of the allocated sub-bands within a threshold value;
a transmitting module to transmit predetermined sample data and a UWB data processed by the transmission data processor to the connected apparatuses; and
a receiving module to receive the performance ranks and data power level information of the sub-bands from the connected apparatuses and to apply the performance ranks and the data power level information to the transmission data processor,
wherein the performance rank information is determined based on applying weights to error rates and a difference between transmitting and receiving power levels of the predetermined sample data for each of the sub-bands wherein the adjusting of the transmission power level comprises:
if the error rate of the predetermined sample data is smaller than the allowable threshold value, adjusting the current power level of the sub-band to the reduced power level; and
if the error rate of the predetermined sample data is larger than the allowable threshold value, adjusting the power level of the sub-band to a previous power level.

9. A data receiving apparatus in a ultra wide band (UWB) communication system, the apparatus comprising:
a reception data processor to select a predetermined number of sub-bands according to performance ranks of the sub-bands based on applying weights to error rates and a difference between transmitting and receiving power levels of predetermined sample data for each of the sub-bands received from apparatuses connected to a network and to generate power level adjustment information based on measured power levels of data of the selected sub-bands; a receiving module to receive UWB data from the apparatuses and to apply the UWB data to the reception data processor; and
a transmitting module to transmit to the connected apparatuses the performance rank information and the data power level information of the sub-bands processed by the reception data processor wherein the generating the power level adjustment information comprises:
if the error rate of the predetermined sample data is smaller than an allowable threshold value, setting a power level value obtained by subtracting a reduced power level from a current power level to a power level adjustment value; and
if the error rate of the predetermined sample data is larger than the allowable threshold value, setting a previous power level value to the power level adjustment value.

10. The method of claim 1, wherein the performance ranks are determined according to performance rank=σ*PESI+β*PLSI;

wherein σ is a weight of a packet error rate, β is (1−σ), PESi is a packet error rate of an i-th sub-band, and PLSi is a power level difference of the i-th sub-band.

11. A non-transitory computer readable storage medium comprising instructions that, when executed by a data transmitting apparatus, cause the apparatus to perform the method of claim 1.

12. The method of claim 6, wherein the performance ranks are determined according to performance rank=σ*PESi+β*PLSi;

wherein σ is a weight of a packet error rate, β is (1−σ), PESi is a packet error rate of an i-th sub-band, and PLSi is a power level difference of the i-th sub-band.

13. A non-transitory computer readable storage medium comprising instructions that, when executed by a data receiving apparatus, cause the apparatus to perform the method of claim 6.

14. An ultra-wide band (UWB) communication system, comprising:
a data transmitting apparatus to transmit predetermined data on all sub-bands of a plurality of band groups, to transmit the predetermined data on selected sub-bands of the sub-bands, to adjust transmission levels of the selected sub-bands so as to fall within an allowable threshold value; and
a data receiving apparatus to receive the predetermined data, to determine the selected sub-bands based on performance rank information and applying weights to an error rate of the sub-band and a difference between transmission and reception power levels of the predetermined data, and to adjust power levels based on the adjusted transmission levels of the received predetermined data for each of the sub-bands wherein the adjusting of the transmission levels comprises:
if the error rate of the predetermined data is smaller than the allowable threshold value, adjusting the current power level of the sub-band to the reduced power level; and
if the error rate of the predetermined data is larger than the allowable threshold value, adjusting the power level of the sub-band to a previous power level.

15. A method of determining optimal sub-bands for ultra wide band (UWB) communication, the method comprising:
transmitting a request for predetermined sample data from a data receiving apparatus;
transmitting the predetermined sample data to the data receiving apparatus on all sub-bands of each of a plurality of band groups;
determining a performance rank for each sub-band based on applying weights to an error rate of the sub-band and a difference between transmission and reception power levels of the predetermined sample data for each of the sub-bands;
selecting a predetermined number of the sub-bands and transmitting information identifying the selected sub-bands;
transmitting the predetermined sample data using the selected sub-bands;
transmitting a request for reduced power levels if an error rate of the predetermined sample data transmitted using the selected sub-bands is less than a threshold value, and re-transmitting the predetermined sample data using the selected sub-bands and the reduced power levels;
repeating the requesting for the reduced power levels and the re-transmitting of the predetermined sample data until the error rate of the predetermined sample data is greater than the threshold value;
and transmitting a request to transmit data using a previous power level if the error rate of the predetermined sample data transmitted using the selected sub-bands is greater than the threshold value.

* * * * *

UNITED STATES PATENT AND TRADEMARK OFFICE
CERTIFICATE OF CORRECTION

PATENT NO. : 8,358,676 B2  
APPLICATION NO. : 12/243220  
DATED : January 22, 2013  
INVENTOR(S) : Young-woo Lee et al.

Page 1 of 1

It is certified that error appears in the above-identified patent and that said Letters Patent is hereby corrected as shown below:

In the Claims:

Column 6, Line 31, In Claim 1, delete "sub bands," and insert -- sub-bands, --, therefor.
Column 6, Line 35, In Claim 1, delete "sub bands;" and insert -- sub-bands; --, therefor
Column 7, Line 6, In Claim 6, delete "(UW8)" and insert -- (UWB) --, therefor.
Column 7, Line 26, In Claim 6, delete "levels ..." and insert -- levels --, therefor.

Signed and Sealed this
Twenty-eighth Day of May, 2013

Teresa Stanek Rea
*Acting Director of the United States Patent and Trademark Office*